United States Patent
Paes et al.

(10) Patent No.: US 11,156,315 B2
(45) Date of Patent: Oct. 26, 2021

(54) PRE-POSITIONER FOR A PROFILED CLAMP AND CONNECTING ARRANGEMENT HAVING SUCH A PRE-POSITIONER

(71) Applicant: NORMA Germany GmbH, Maintal (DE)

(72) Inventors: Stephen Paes, Hampshire (GB); Manuel Baudoin, Newbury (GB); Erkan Kayacik, Istanbul (TR); Ben Cottle, Newbury (GB)

(73) Assignee: Norma Germany GmbH, Maintal (DE)

( * ) Notice: Subject to any disclaimer, the term of this patent is extended or adjusted under 35 U.S.C. 154(b) by 453 days.

(21) Appl. No.: 16/082,166

(22) PCT Filed: Mar. 2, 2017

(86) PCT No.: PCT/EP2017/054975
§ 371 (c)(1),
(2) Date: Sep. 4, 2018

(87) PCT Pub. No.: WO2017/149104
PCT Pub. Date: Sep. 8, 2017

(65) Prior Publication Data
US 2019/0093802 A1    Mar. 28, 2019

(30) Foreign Application Priority Data
Mar. 4, 2016    (DE) .......................... 102016103986.1

(51) Int. Cl.
*F16L 23/00*    (2006.01)
*F16L 23/08*    (2006.01)
(Continued)

(52) U.S. Cl.
CPC .............. *F16L 23/003* (2013.01); *F16B 2/02* (2013.01); *F16B 2/20* (2013.01); *F16L 23/04* (2013.01); *F16L 23/08* (2013.01)

(58) Field of Classification Search
CPC ..... F16B 2/20; F16B 2/02; F16L 23/04; F16L 23/003; F16L 23/08
See application file for complete search history.

(56) References Cited

U.S. PATENT DOCUMENTS

| 2,413,402 A | 12/1946 | Becker |
| 3,015,883 A * | 1/1962 | Brown ...................... F16L 1/10 |
| | | 29/271 |

(Continued)

FOREIGN PATENT DOCUMENTS

| DE | 60020423 T2 | 3/2006 |
| DE | 102011101506 A1 | 1/2012 |

(Continued)

OTHER PUBLICATIONS

International Search Report for PCT/EP2017/054975, dated May 17, 2017, 4 pages.

(Continued)

*Primary Examiner* — Robert Sandy
*Assistant Examiner* — Louis A Mercado
(74) *Attorney, Agent, or Firm* — Reising Ethington, P.C.

(57) ABSTRACT

A pre-positioner for a profiled clamp being formed in two parts with a first element and a second element, wherein the first element can be fastened to a line end and the second element can be fastened to the profiled clamp. The disclosure further relates to a connecting arrangement having such a pre-positioner. To allow a simple mounting of the pre-positioner, the first element is designed to be stirrup-shaped with a foot portion which can be secured to the line end and with a holding portion which is offset radially outwards with (Continued)

respect to the foot portion. The holding portion has a cutout, wherein the second element has a pin which extends in the radial direction and which can be inserted into the cutout.

16 Claims, 2 Drawing Sheets

(51) Int. Cl.
*F16L 23/04* (2006.01)
*F16B 2/02* (2006.01)
*F16B 2/20* (2006.01)

(56) References Cited

U.S. PATENT DOCUMENTS

| | | | |
|---|---|---|---|
| 6,030,005 A * | 2/2000 | Andersson | F16L 23/04 285/233 |
| 6,709,021 B2 * | 3/2004 | Duncan | F16L 33/04 285/109 |
| 6,832,786 B2 * | 12/2004 | Duncan | F16L 33/04 285/109 |
| 8,060,991 B2 | 11/2011 | Ryhman et al. | |
| 8,544,267 B2 * | 10/2013 | Danielewicz | F02B 39/00 60/602 |
| 10,415,610 B2 * | 9/2019 | You | F16B 21/186 |
| 2004/0207195 A1 * | 10/2004 | Bowater | F16L 33/08 285/23 |
| 2019/0063646 A1 * | 2/2019 | Bopp | F16L 37/1225 |
| 2019/0331270 A1 * | 10/2019 | Drivon | F16L 23/003 |
| 2020/0141525 A1 * | 5/2020 | Drivon | F16L 23/08 |
| 2020/0240557 A1 * | 7/2020 | Guevel | F02C 6/08 |
| 2021/0018121 A1 * | 1/2021 | Drivon | F16L 23/003 |

FOREIGN PATENT DOCUMENTS

| | | |
|---|---|---|
| DE | 202013001224 U1 | 4/2013 |
| EP | 1840439 A2 | 10/2007 |
| EP | 2292964 A2 | 3/2011 |

OTHER PUBLICATIONS

English Translation of International Search Report for PCT/EP2017/054975, dated May 17, 2017, 3 pages.
1st German Office Action for DE 10 2016 103 986.1 dated Feb. 14, 2017, 4 pages.

* cited by examiner

PRE-POSITIONER FOR A PROFILED CLAMP AND CONNECTING ARRANGEMENT HAVING SUCH A PRE-POSITIONER

INTRODUCTION

The disclosure relates to a pre-positioner for a profiled clamp and to a connecting arrangement having such a pre-positioner.

Profiled clamps are used, in general, to connect two lines which comprise connecting flanges at their line ends. The profiled clamp, in this case, usually encompasses the two connecting flanges at their end faces remote from one another and, during tightening, presses the connecting flanges axially against one another. The profiled clamp, in general, has a substantially V-shaped profile for this purpose. During the tightening of the profiled clamp, therefore, not only is a radial force exerted onto the connecting flange but also an axially directed force which presses the line ends together.

Assembly of the disclosed profiled clamp, however, is relatively difficult in many areas of application. In particular, where the spatial conditions are cramped, it can be problematic for the fitter to press the connecting flanges together on the one hand and on the other hand to move the profiled clamp into position and tighten it. Frequently, in this case, the position of the desired line connection is also only accessible from one side.

As a result of a pre-positioner, the profiled clamp can be arranged then at the desired position on the line end and can be tightened at a later time. In this case, it is known to assemble the pre-positioner from two elements, the one element of which in the form of a pin is fixed on the line end and the other element in the form of a tab with an axial guide groove for the pin is fixed on the clamp strip of the profiled clamp. A movement in the radial direction, which occurs when the profiled clamp is tightened, is made possible, in this case, by means of the material elasticity of the tab. To insert the pin into the guide groove, it is necessary to move the profiled clamp in the axial direction and said movement is frequently made difficult by the connecting flange. Assembly is relatively time-consuming and expensive as a result.

SUMMARY

One object in an embodiment is to provide a pre-positioner which allows for simple assembly.

In the case of a pre-positioner for a profiled clamp, which is realized in two parts with a first element and a second element, wherein the first element is fastenable on a line end and the second element is fastenable on the profiled clamp, it is provided according to an embodiment that the first element is realized in a stirrup-shaped manner with a foot portion which is fixable on the line end and a holding portion which is offset radially outward, is opposite the foot portion and comprises a recess, wherein the second element comprises a pin and is insertable into the recess in the circumferential direction or in the radial direction.

By means of said design, the two elements can be moved into engagement with one another as a result of a relative movement in the circumferential direction or the radial direction, where applicable in conjunction with a pivoting movement, the interaction between the pin and the edges of the recess limiting the axial freedom of movement. Pre-positioning the profiled clamp with the new pre-positioner is possible, as a result, with little effort or expenditure.

In this case, it is preferred in an embodiment for the second element to be radially movable in relation to the first element with the guide pin situated in the groove. This does not obstruct the radial displacement between the elements of the pre-positioner which occurs when the profiled clamp is tightened. Rather, the guide pin is able to enter into the groove to a lesser or greater extent in the radial direction, a movement space necessary for this being provided by the radial spacing of the holding portion of the first element, in which the groove is realized.

In an embodiment it is provided that the recess is realized as a groove which extends in the circumferential direction and is open in particular on one side. A movement of the profiled clamp in the circumferential direction during the assembly is also easily possible when the profiled clamp is already arranged on the connecting flange. Simple assembly is thus provided.

The pin is realized as a guide pin in an embodiment which is insertable into the groove in the circumferential direction. The profiled clamp can thus be pre-positioned on a flange and then the pin can be moved into the groove as a result of rotating the profiled clamp in relation to the flange. The position then assumed is then secured at least in the axial direction by the pin in the groove.

In an embodiment, on its radial inner end the guide pin comprises a widening which is wider than the groove, wherein the widening is insertable between the holding portion and the line end. As a result of said widening, a relative movement in the radial direction is limited as it prevents the guide pin being pulled out in the radial direction. Further insertion of the guide pin, as is necessary when the profiled clamp is tightened, is, in contrast, additionally possible. The guide pin is then connected to the second element at its radially outer end.

In an embodiment, the recess is realized as an opening with a closed circumferential edge. The pin inserted into the opening consequently produces not only securement in the axial direction but also in both circumferential directions.

In an embodiment, it is preferred for the second element to be pivotable in relation to the first element when the pin is partially inserted into the opening, as a result of which the pin is insertable further into the opening. The profiled clamp is placed around the flange with the pre-positioner simultaneously as a result of said pivoting movement. It is only necessary first of all during assembly to insert a free end of the pin into the opening and then to carry out the pivoting movement. Thus, in one step, not only is the profiled clamp pre-mounted on the flange but the position thereof is also secured by means of the pre-positioner.

The recess comprises, in an embodiment, a latching constriction. Said latching constriction, that is to say in particular a constriction of the groove, can also prevent the pin being removed out of the recess unintentionally without fully suppressing a movement in the circumferential direction. The groove acts in a similar manner to a holding bracket as a result of the latching constriction. Once it has passed the latching constriction, the pin is held, in contrast, with a certain freedom of movement in the region of the closed end of the guide groove, there being restricted mobility in all directions.

The pin is fixable on the profiled clamp by means of a bridge which extends in the axial direction. The bridge, in this case, cooperates with the radially outer end of the pin. The pin can be axially offset in relation to the profiled clamp such that the first element can also be arranged at a desired distance from the connecting flange.

In an embodiment, the first element comprises a foot portion, wherein an end of the holding portion remote from the foot portion is free. The first element can thus comprise a relatively short extent in the circumferential direction and consequently can be produced with relatively little material expenditure and consequently weight. In addition, the free end of the holding portion results in a certain elasticity of the first element in the radial direction. The occurrence of pressure between the first and the second elements when the profiled clamp is tightened is thus avoided. At the same time, said elasticity can be utilized for mounting the profiled clamp on the flange in a simpler manner.

In an embodiment, the first element comprises two foot portions, between which the holding portion is arranged. The first element can be realized in a very sturdy manner as a result and can be connected to the line end at two points.

In this case, the foot portions and the holding portion preferably lie side by side in the circumferential direction. The first element then only takes up relatively little space in the axial direction. At the same time, a relatively high level of stability is obtained in the circumferential direction which is advantageous to the insertion of the pin into the groove and to the axial securement of the position.

In an embodiment, a connecting arrangement with a line end and a profiled clamp which is held on the line end by means of the pre-positioner, wherein a first element of the pre-positioner is fastened on the line end and a second element of the pre-positioner is fastened on the profiled clamp.

With the pre-positioner according to an embodiment, a connection between the two elements of the pre-positioner can be produced as a result of a simple rotational movement or radial movement in particular in conjunction with a pivoting movement of the profiled clamp in relation to the line end by the pin being inserted into the recess. The pre-positioner, in this case, enables compensation of positional changes and positional differences in the radial direction and, where applicable, in the circumferential direction. In contrast, a relatively defined position in the axial direction is held.

The bridge of the pre-positioner is fastened on a radial outside surface of a clamp strip of the profiled clamp, in an embodiment. There is sufficient space available there, the pre-positioner being able to be fastened on the clamp strip with minimal effort and expenditure, for example as a result of welding, crimping or riveting. In addition, the pre-positioner is not countered by contact between an inside surface of the clamp strip and the connecting flanges.

In an embodiment the pre-positioner comprises a connecting element, which connects two portions of a clamp strip of the profiled clamp together, from which the bridge proceeds. In the case of profiled clamps said connecting element serves, at the same time, as a spring element in order to be able to widen the profiled clamp sufficiently and to place it about the connecting flange. The bridge and the connecting element, in particular including the pin, can be produced, in this case, in one part from a sheet metal part or similar, for example as a result of punching and then reworking. The bridge, in this case, proceeds in particular in a centered manner from a longitudinal side of the connecting element and extends substantially at right angles thereto in the axial direction, whilst the connecting element extends in the circumferential direction. At the end of the bridge remote from the connecting element, said bridge merges into the pin which is bent by 90° in relation to the bridge such that it extends in the radial direction. At its radially inner end, the pin can then comprise one or two feet which extend in the axial direction again and can also be obtained as a result of corresponding bending.

A radial distance between the line end and the holding portion corresponds, as regards the amount, at least to a reduction in the diameter which occurs when the profile clamp is tightened. Sufficient space is consequently available in the radial direction for the pin not to move into contact with the line end even when the profiled clamp is tightened.

Further features, details and advantages are produced from the wording of the claims and from the following description of exemplary embodiments by way of the drawings, in which:

DETAILED DESCRIPTION

Figure 1:
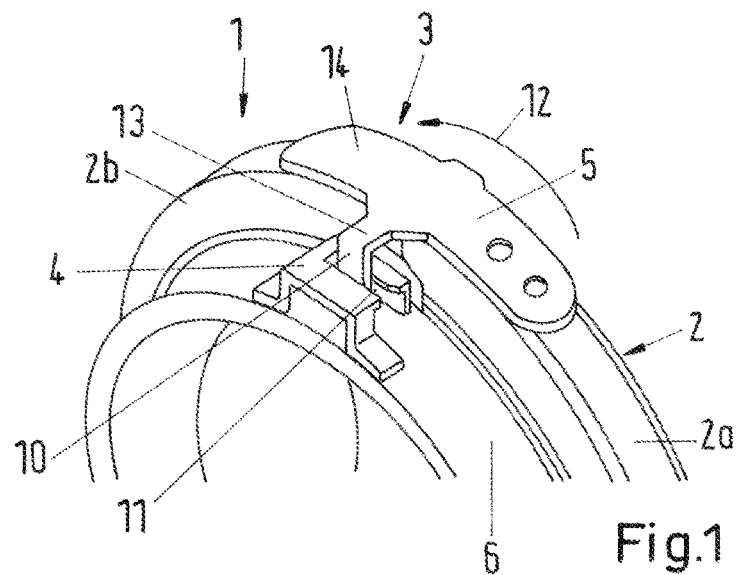
FIG. 1 shows a spatial representation of a profiled clamp with a first embodiment of a pre-positioner and FIG. 2 shows a first, stirrup-shaped element of the pre-positioner.

FIG. 1 shows an embodiment of a profiled clamp 1 with a clamp strip 2 which includes at least two halves 2a, 2b. The two halves 2a, 2b of the clamp strip 2 are connected together by means of a pre-positioner 3 which comprises a first element 4 and a second element 5.

The first element 4 is fastened to a line end 6, whilst the second element 5 is fixed on the profiled clamp 1. The first element 4 comprises two foot portions 7, 8, between which is realized a holding portion 9 which is offset radially outward in relation to the foot portions 7, 8. This creates a space into which a pin 10 of the second element 5, which pin is realized as a guide pin, is able to enter, between the holding portion 9 and the line end 6.

A recess in the form of a groove 11, which extends in the circumferential direction and is realized open at a circumferential-side end and closed at the opposite end, is realized in the holding portion 9 of the first element 4 for guiding the guide pin 10. As a result, the guide pin can move into the groove 11 as a result of a mounting movement directed in the circumferential direction between the first element 4 and the second element 5. Said assembly movement is symbolized by an arrow 12.

Along with the guide pin 10, the second element 5 includes a bridge 13 and a connecting element 14. The connecting element 14 extends, in this case, in the circumferential direction of the profiled clamp and connects the two halves 2a, 2b of the clamp strip 2 in an articulated manner to one another. The connecting element is fastened on the outside surfaces of the clamp strip 2 for this purpose, for example by means of spot-welding or a crimp connection.

The bridge 13 extends in the axial direction perpendicularly to the connecting element and protrudes at the center of a longitudinal side of the connecting element 14. As a result, the guide pin 10, which is situated at the end of the bridge 13 remote from the connecting element 14, can be arranged at an axial spacing from the profiled clamp.

Figure 2:
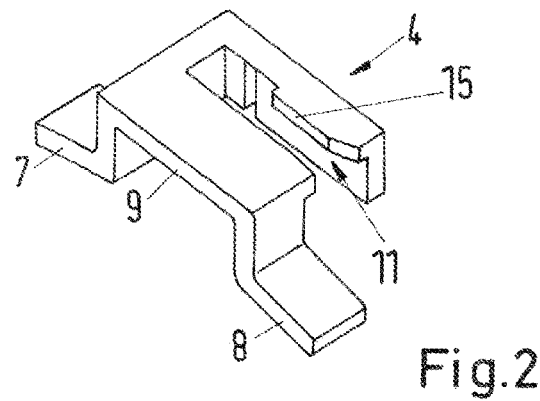

FIG. 2 shows the first element 4 of the pre-positioner. It can be seen that, at its open end, the groove 11 comprises a latching constriction 15 which widens toward the closed end. The width of the groove 11 there is such that the guide pin 11 has enough axial room to avoid frictional losses and additional stresses when the profiled clamp is tightened.

Figure 3:
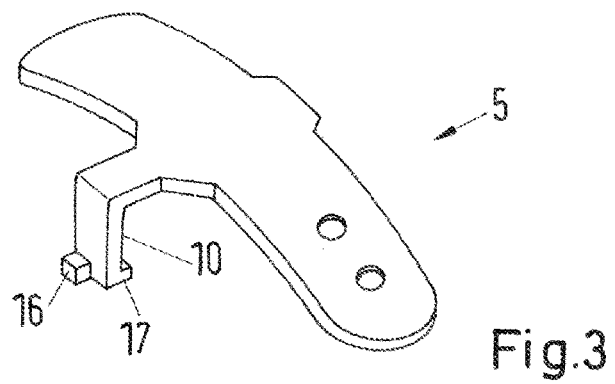
FIG. 3 shows a second element of the pre-positioner.

FIG. 3 shows the second element 5 of the pre-positioner. The connecting element 14 is formed in one piece with the bridge 13 and the guide pin 10 from a corresponding sheet metal part or plastic material part. At its free end, the guide pin 10 comprises two oppositely directed feet 16, 17 which prevent the guide pin 10 being pulled out of the groove 11 in the radial direction and, in the event of an impact against the line end, provide for relatively flat contact. This minimizes any risk of damage to the line end.

Figure 4:
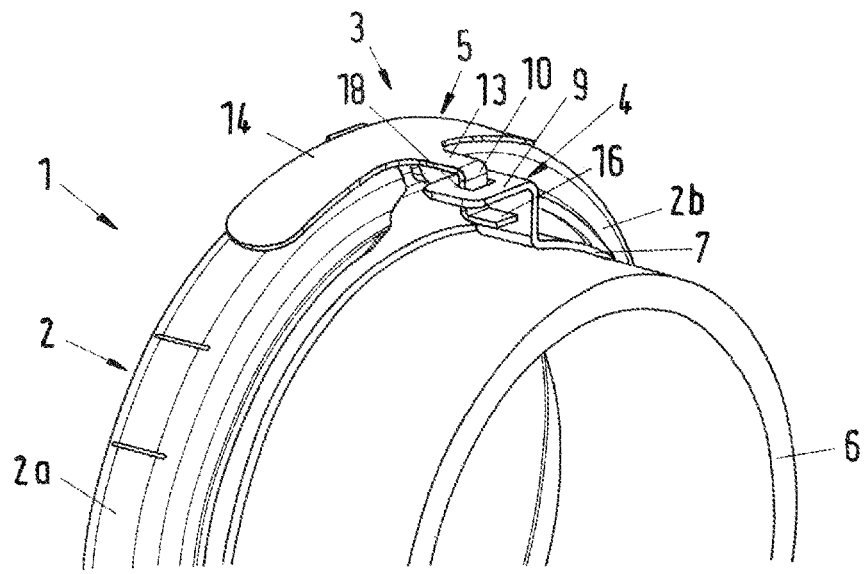
FIG. 4 shows a profiled clamp with a second embodiment of a pre-positioner.

FIG. 4 shows a profiled clamp 1 with a design of the pre-positioner 3 in which identical or corresponding elements are provided with the identical reference symbols as in the embodiment according to FIGS. 1 to 3.

In this case, the recess 18 in the holding portion 9 of the first element 4 is realized as an opening with a closed circumferential edge into which the pin 10 of the second element 5 is inserted in such a manner that a bent end 16 of the pin 10 extends in the axial direction and thus also brings about positional securement in the radial direction. The first element 4 is additionally fixed on the line end 6 only by means of a foot portion 7, whilst an end of the holding portion 9 remote from the foot portion 7 is free. This enables a certain flexibility of the first element 4.

Figure 5:
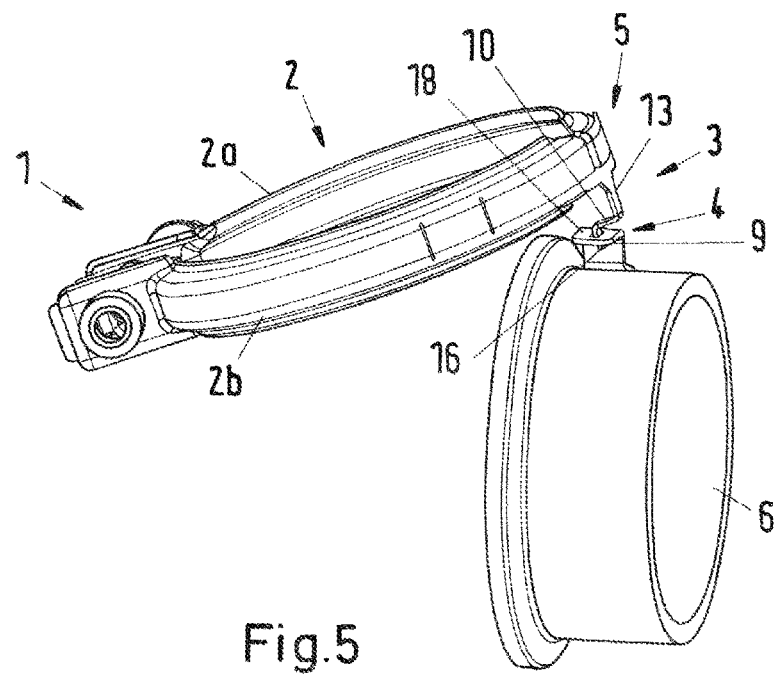
FIG. 5 shows the profiled clamp according to FIG. 4 prior to assembly on a flange.

FIG. 5 shows how the profiled clamp 1 is mounted with the pre-positioner 3 as a result of pivoting in relation to the line end 6. In the case of the starting state shown in FIG. 5, the foot 16 of the pin 10 is already inserted into the opening 18. As a result of the subsequent pivoting, not only is the profiled clamp 1 positioned on the flange but the pin 10 is also moved further into the opening 18 until the foot 16 finally lies on a side of the holding portion 9 remote from the bridge 13 in the axial direction. Consequently, positional securement (with play) is obtained in all directions in space, said securement having at least so much play in the radial direction, however, that tightening the profiled clamp 1 with the diameter reduction connected thereto is not obstructed.

The pre-positioner according to an embodiment enables very simple pre-positioning of a profiled clamp onto ring flanges, the two elements of the pre-positioner being able to be moved into engagement with one another either once the profiled clamp has been arranged on the flanges as a result of a simple rotational movement of the profiled clamp or as a result of a pivoting movement of the profiled clamp. A movement in the axial direction, which would be made difficult or obstructed by the ring flanges, is not necessary for this. As a result of the holding portion which is at a spacing radially from the line end, in contrast, a radially relative movement over a sufficient distance is easily possible such that a tightening of the profiled clamp is not obstructed.

The invention is not limited to one of the above-described embodiments but is convertible in diverse ways.

All features and advantages, including structural details, spatial arrangements and method steps, emanating from the claims, the description and the drawing can be essential to the invention on their own per se and in the most varied combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various other changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A pre-positioner for a profiled clamp which pre-positioner is realized in two parts with a first element and a second element, wherein the first element is fastenable on a line end and the second element is fastenable on the profiled clamp, wherein the first element is realized in a stirrup-shaped manner with a foot portion which is fixable on the line end and a holding portion which is offset radially outward, is opposite the foot portion and comprises a recess, wherein the second element comprises a pin which extends in a radial direction and is insertable into the recess.

2. The pre-positioner as claimed in claim 1, wherein the recess is realized as a groove which extends in a circumferential direction and is open in particular at one end.

3. The pre-positioner as claimed in claim 2, wherein the pin is realized as a guide pin which is insertable into the groove in the circumferential direction.

4. The pre-positioner as claimed in claim 3, wherein, on its radial inner end, the guide pin comprises a widening which is wider than the groove, wherein the widening is insertable between the holding portion and the line end.

5. The pre-positioner as claimed in claim 3, wherein the second element is radially movable in relation to the first element with the guide pin which is situated in the groove.

6. The pre-positioner as claimed in claim 1, wherein the recess is realized as an opening with a closed circumferential edge.

7. The pre-positioner as claimed in claim 6, wherein the second element is pivotable in relation to the first element when the pin is partially inserted into the opening, as a result of which the pin is insertable further into the opening.

8. The pre-positioner as claimed in claim 1, wherein the recess comprises a latching constriction.

9. The pre-positioner as claimed in claim 1, wherein the pin is fixable on the profiled clamp by means of a bridge which extends in an axial direction.

10. The pre-positioner as claimed in claim 1, wherein the first element comprises the foot portion, wherein an end of the holding portion remote from the foot portion is free.

11. The pre-positioner as claimed in claim 1, wherein the first element comprises two foot portions, between which the holding portion is arranged.

12. The pre-positioner as claimed in claim 11, wherein the foot portions and the holding portion lie side by side in a circumferential direction.

13. A connecting arrangement with the line end and the profiled clamp which is held on the line end by means of the pre-positioner as claimed in claim 1, wherein the first element of the pre-positioner is fastened on the line end and the second element of the pre-positioner is fixed on the profiled clamp.

14. The connecting arrangement as claimed in claim 13, wherein a bridge of the pre-positioner is fastened on a radial outside surface of a clamp strip of the profiled clamp.

15. The connecting arrangement as claimed in claim 14, wherein the pre-positioner comprises a connecting element, which connects two halves of the clamp strip of the profiled clamp together, from which the bridge proceeds.

16. The connecting arrangement as claimed in claim 13, wherein a radial distance between the line end and the holding portion corresponds, as regards an amount, at least to a reduction in a diameter which occurs when the profile clamp is tightened.

\* \* \* \* \*